No. 673,110. Patented Apr. 30, 1901.
G. A. BRONDER.
MOTOR VEHICLE.
(Application filed Feb. 18, 1898.)

(No Model.) 7 Sheets—Sheet 1.

Fig. 1.

Witnesses:
George Barry Jr.
Edward Vieser

Inventor:
Gaston A. Bronder
by attorneys
Brown & Seward

THE NORRIS PETERS CO., PHOTO-LITHO., WASHINGTON, D. C.

No. 673,110. Patented Apr. 30, 1901.
G. A. BRONDER.
MOTOR VEHICLE.
(Application filed Feb. 18, 1898.)
(No Model.) 7 Sheets—Sheet 3.

Fig. 3.

Witnesses:-
George Barry Jr.
Edward Vieser

Inventor:-
Gaston A Bronder
By attorneys
Brown & Seward

No. 673,110. Patented Apr. 30, 1901.
G. A. BRONDER.
MOTOR VEHICLE.
(Application filed Feb. 18, 1898.)
(No Model.) 7 Sheets—Sheet 4.

Fig. 4.

Witnesses:
George Barry Jr.
Edward Vieser.

Inventor:
Gaston A. Bronder
by attorneys
Brown & Seward

No. 673,110. Patented Apr. 30, 1901.
G. A. BRONDER.
MOTOR VEHICLE.
(Application filed Feb. 18, 1898.)
(No Model.) 7 Sheets—Sheet 6.

Witnesses:
George Barry Jr.
Edward Vieser.

Inventor:
Gaston A. Bronder
by attorneys
Brown & Seward

No. 673,110. Patented Apr. 30, 1901.
G. A. BRONDER.
MOTOR VEHICLE.
(Application filed Feb. 18, 1898.)
(No Model.) 7 Sheets—Sheet 7.

Witnesses:
George Barry Jr.
Edward Vieser

Inventor:
Gaston A. Bronder
by attorneys
Brown & Seward

UNITED STATES PATENT OFFICE.

GASTON A. BRONDER, OF NEW YORK, N. Y.

MOTOR-VEHICLE.

SPECIFICATION forming part of Letters Patent No. 673,110, dated April 30, 1901.

Application filed February 18, 1898. Serial No. 670,744. (No model.)

*To all whom it may concern:*

Be it known that I, GASTON A. BRONDER, a citizen of the United States, and a resident of the borough of Brooklyn, in the city of New York and State of New York, have invented new and useful Improvements in Motor-Vehicles, of which the following is a specification.

This invention relates for the most part to motor-vehicles irrespective of the kind of motor employed upon them; but it also relates especially to such a vehicle the motor of which consists of an engine actuated by an explosive mixture—such, for example, as a mixture of air and the vapor of a liquid hydrocarbon, as gasolene.

The invention consists in certain combinations which will be hereinafter described in detail and are embodied in the example illustrated in the accompanying drawings, which represent a vehicle propelled by a motor consisting of such an engine as has been hereinabove mentioned.

Fig. 6, a vertical sectional view taken parallel with the main or driving axle, representing parts of the motor-shaft and speed-changing shaft, the speed-changing gearing and a hand-lever, and connections whereby the engagements of the gearing are changed; Figs. 7, 7*, 8, 9, and 10, detail views of the said hand-lever and connections, which will be hereinafter described; Fig. 11, a transverse section of the speed-changing shaft and a face view of the clutch of one of its gears; Fig. 14 is a side view of the reversing-gearing.

Similar letters of reference designate corresponding parts in all the figures.

A A' A² A³ designate the platform or frame of the vehicle, upon or by which the motor, the driving-gearing, and the mechanism for controlling the movements and the steering of the vehicle are supported. This platform or frame is itself supported upon the wheels B B and C C in the manner to be hereinafter described. The said platform or frame is represented as composed of rigidly-connected side-bars A A and cross-bars A' A² A³ of angle iron or steel. Upon this frame is built the seat A* for the driver and one or more passengers.

Figure 1:
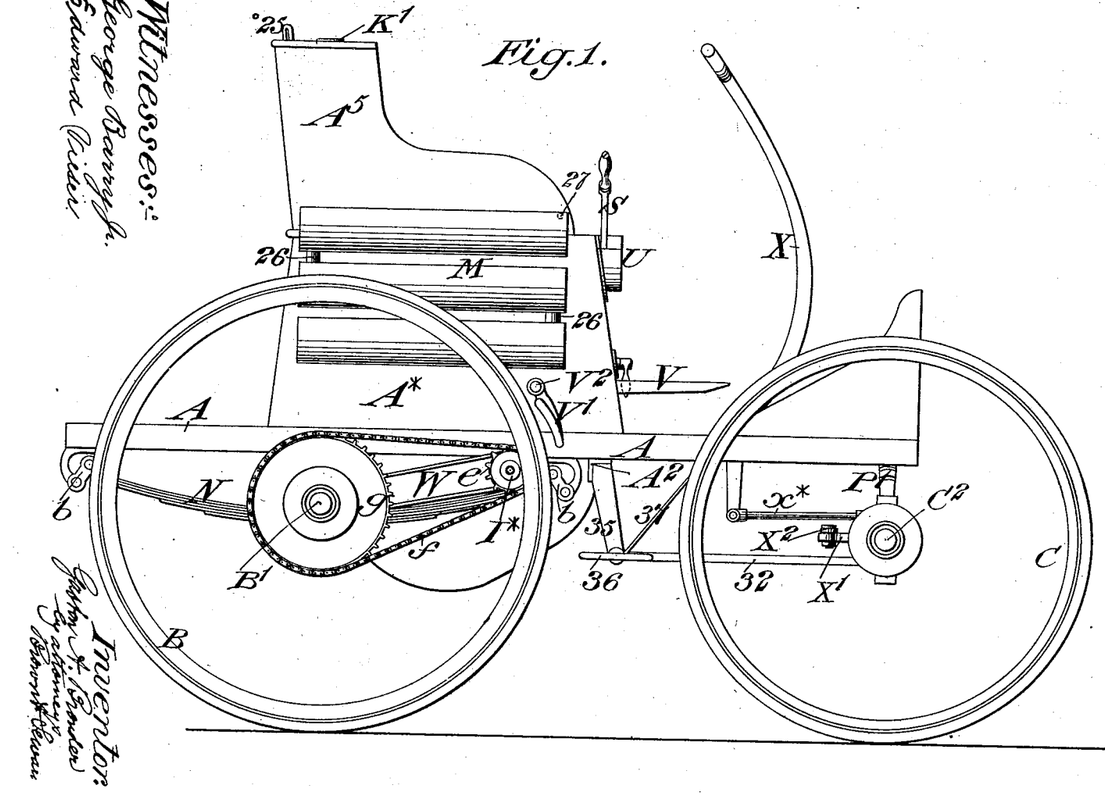
Figure 1 is a side view.
Figures 1, 2:
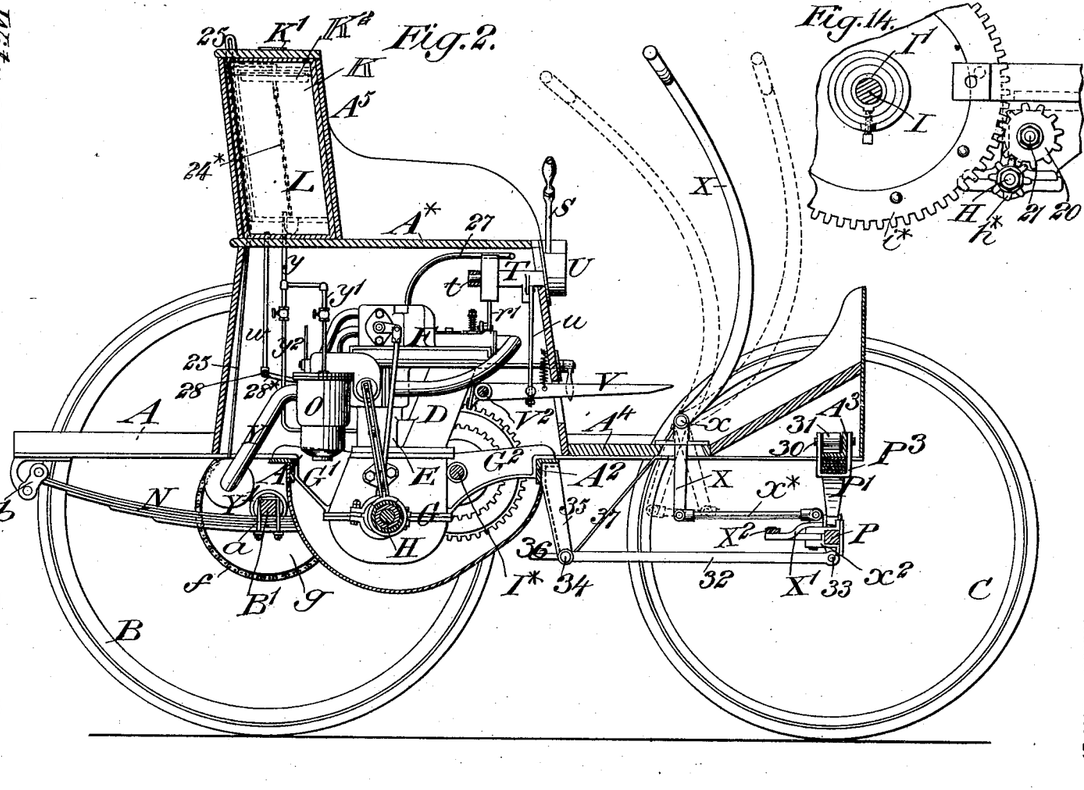
Fig. 2, a longitudinal vertical section taken just within the right-hand side bar of the platform of the vehicle.

D E F G H designate the motor, represented as a double engine, D indicating the compression-cylinders; E, the power-cylinders; F, hollow castings, each constituting heads to the two corresponding cylinders E F and containing all their necessary valves, as well as an explosion-chamber between the said cylinders; G, the bed-plate or base, upon which are supported all the cylinders and in which are the bearings for the crank-shaft H, from which the power of the motor is transmitted, as hereinafter described, to the driving-wheels B, which are fitted to run loosely on the rear axle B'. The crank-shaft H is represented as furnished with a fly-wheel H'. The bed-plate or base G is represented (see Fig. 2) as supported by brackets G' G² on the two cross-bars A' A² of the platform, and all the parts of the motor, including the carbureter O and the heater O' for heating the air to be charged with vapor in the carbureter, are included in the space under the seat A*. The back A⁵ of the seat A* is made hollow to constitute a box or chamber which contains the tank K, from which the gasolene is to be supplied to the carbureter, and a tank L, from which water is to be supplied to jackets surrounding the power-cylinders and their valves and explosion-chambers for the purpose of cooling said cylinders and chambers. Outside of the seat, on each side thereof, there is attached a cooler M, to be hereinafter described in detail, for the purpose of cooling the said water after it has done duty in said jackets and while on its way back therefrom to the said tank L, whence it is to be supplied again and again to the jackets.

Figure 3:
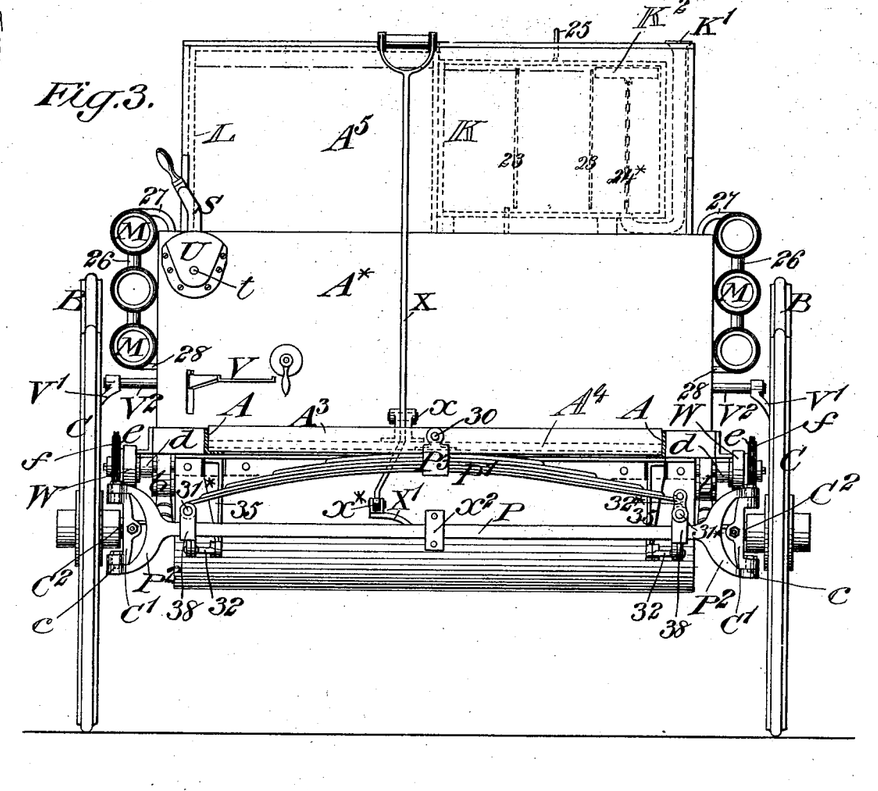
Fig. 3, a front view omitting the dashboard.

The rear part of the platform A A' A² A³ is supported upon the rear axle B' and wheels B by means of springs N, one on each side. The said springs may be of any suitable kind, but are represented as ordinary semi-elliptical springs and secured fixedly to the axle by ordinary clips $a$, (see Figs. 2, 12, and 13,) the side bars A of the platform being suspended from the ends of said springs by short swinging links $b$. The front part of the platform is supported upon its front wheels C by an axletree P and a spring P', the said axletree having formed or rigidly attached to its ends yokes $P^2$, which receive within them the cross-heads C' of the two short axles $C^2$ of the wheels C, the said cross-heads being so pivoted vertically into the yokes $P^2$ by pivots $c$ that the wheels may, for the purpose of steering, be free to turn at any desirable angle to the axle, as indicated in dotted outlines in Fig. 5, without the turning of the axletree, the axletree being connected near its yokes, as shown in Fig. 3, with the ends of the spring P' and the spring receiving upon it and having fixedly connected with it the front cross-bar $A^3$ of the platform.

Rotary motion for driving the vehicle is transmitted from the shaft H of the motor to the driving-wheels B through an intermediate shaft I', represented as hollow and fitted as a sleeve to turn upon a shaft I I*. The said shaft I I* is divided, as shown at $j$ in Fig. 6, into two lengths or sections and is fitted to journal-boxes $d$, secured to the bars A of the platform and another box $d'$ in one of the engine-brackets $G^2$. The intermediate or sleeve shaft I' is supported in part by the shaft I I* and in part by a bearing in one of the engine-brackets $G^2$, and it is geared with the main shaft H by differential gearing consisting of gears $h'$ $h^2$ $h^3$ $h^*$ on the motor-shaft and gears $i'$ $i^2$ $i^3$ $i^*$ on itself, as will be presently more fully described. Each of the shaft-sections I I* carries at its outer end a sprocket-wheel $e$, from which a chain $f$ runs on and drives a sprocket-wheel $g$, fast on the driving-wheel B on the corresponding side of the vehicle. The three driving-gears $h'$ $h^2$ $h^3$ are all fast upon the motor-shaft. The corresponding three $i'$ $i^2$ $i^3$ are all arranged loosely on the sleeve-shaft I', each of said gears being capable of being separately secured to said shaft by one of the three separate friction-clutches Q' $Q^2$ $Q^3$, which are fast upon said shaft. The gears $h'$ $h^2$ $h^3$ and their corresponding gears $i'$ $i^2$ $i^3$ are respectively of such size that $h'$ and $i'$ will drive said shaft I' at the highest speed, those $h^3$ $i^3$ at the lowest speed, and those $h^2$ $i^2$ at an intermediate speed. The two shaft-sections I I* have fast on their adjacent ends two similar bevel-gears $l$, both of which gear with two similar bevel-gears $l'$, which are capable of turning freely on radial pivots $l^2$ in a box $I^2$, which constitutes that portion of the sleeve-shaft I' which surrounds the bevel-gears and the adjacent ends of the two shaft-sections. The rotary motion of the sleeve-shaft, acting through the bevel-gears $l'$ on the bevel-gears $l$, will drive both shaft-sections I I*, and when under normal conditions or when there is no tendency to retard one or other section, as when the vehicle is running a straight course, both sections will be driven constantly at the same speed of the sleeve-shaft, the gears $l'$ then revolving about the axis of the shafts without turning on their pivots; but in case of there being any tendency to temporary retardation of either shaft-section I or I* relatively to the other, as will be the case in turning the vehicle, when one driving-wheel will turn slower than the other, this retardation will be permitted and compensated for by the turning of the gears $l'$ on their pivots $l^2$. The driving of the two shaft-sections I I* through the bevel-gears $l'$ $l'$ thereon may be effected by a single gear $l'$, carried by the sleeve-shaft; but I prefer to use two such gears $l'$ $l'$, as illustrated and described.

Figures 6, 7, 8, 9, 10, 11:
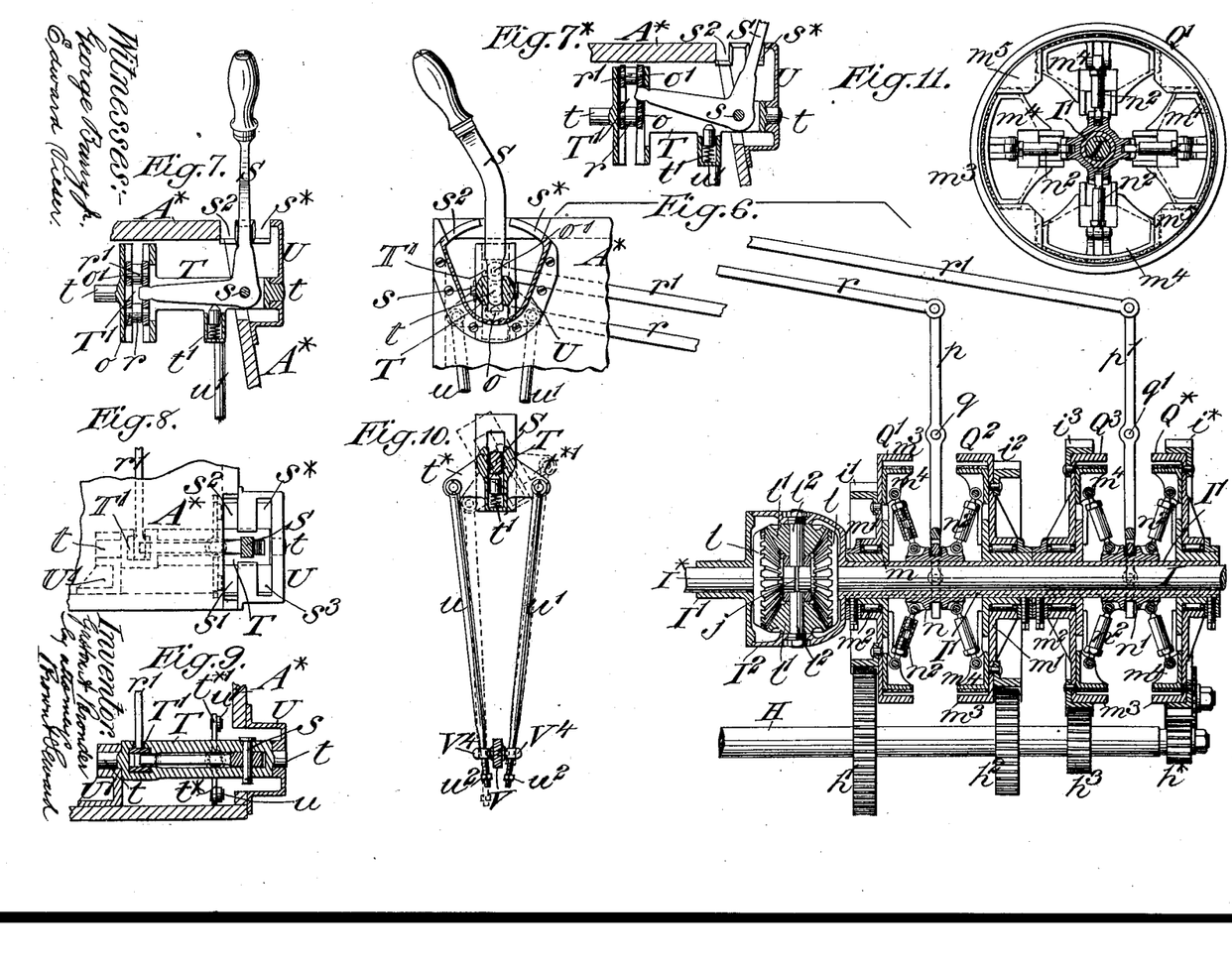
Figure 13:
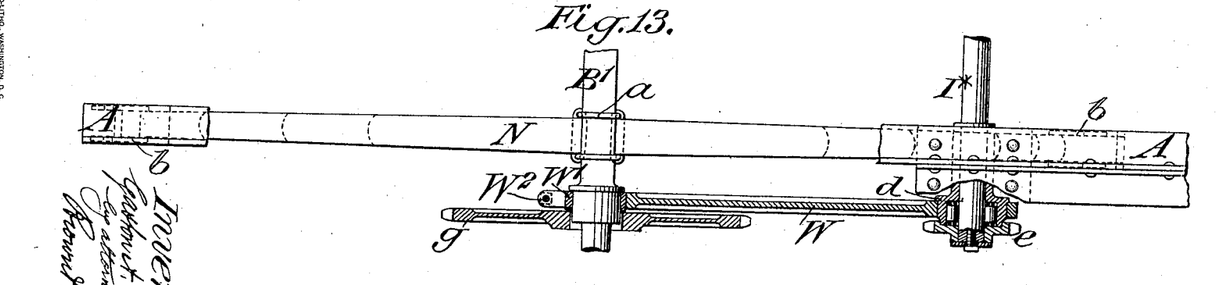
Fig. 13, a plan of the same.

The gear $h^*$ on the motor-shaft H and the gear $i^*$ on the sleeve-shaft I' are for reversing the movement of the vehicle or, in other words, for backing it, there being between the said gears, as shown in Figs. 6, 13, and 14, an idler-gear 20, which turns loosely on a fixed stud 21 on the platform. The gear $h^*$ is fast on the motor-shaft, and the gear $i^*$ is normally loose on the shaft I', but capable of being fastened thereto, when desired, by a clutch Q*, which is fast on the sleeve.

The clutches Q' $Q^2$ $Q^3$ Q* may be of any suitable kind. They are represented (see Figs. 6 and 11) as each composed of a flanged hub $m$, fast on the shaft I', and a disk $m'$, fitted with a roller-bearing $m^2$ on the said hub and having secured to it the toothed ring $i'$, $i^2$, $i^3$, or $i^*$, which constitutes the gear. The said disk has a rim $m^3$, and there is arranged within the said rim a series of segments $m^4$, which slide radially in guides $m^5$ on its face. These segments are connected by toggle-links $n^2$ with a short sleeve $n$ or $n'$, which is so fitted to the shaft I' as to be capable of sliding lengthwise on it, but to be incapable of turning on it. By moving the sleeve $n$ or $n'$ lengthwise of the shaft I' the toggles are moved outward and inward into or out of contact with the rim and so caused to engage the rim and the attached gear with the shaft I' or disengage it therefrom. In Fig. 6 one sleeve $n$ is represented as serving for the two clutches Q' $Q^2$ and one sleeve $n'$ for the two $Q^3$ Q*. The sleeve $n$ is operated by a lever $p$, working on a fixed fulcrum-pin $q$ in a bracket R, which is affixed to one side of the vehicle, and the sleeve $n'$ is operated by a lever $p'$ on a fixed fulcrum-pin $q'$ in the same bracket. These levers $p$ $p'$ are each connected by one of two rods $r$ $r'$ with a hand-lever S, arranged in front of the seat, as shown in Figs. 1, 2, 3, 4, and 5, within reach of the driver for the control of the driving-gearing. The connections of the rods $r$ $r'$ with the hand-lever S and the movements of which the said lever is capable are such as to provide for starting and stopping and to permit the changes to be made from any one to any other of the three speeds and from running forward at any of the three speeds to running backward in a very direct and simple manner. The said connections will now be described with reference to Figs. 4, 6, 7, 7*, 8, and 9, Figs. 7 and 7* representing vertical sections at right angles to Fig. 6, and Fig. 8 a plan view.

The lever S, which is of elbow form, has two fulcrums $s$ and $t$ at right angles to each other, which permit it to be moved both backward and forward to bring either rod $r$ or $r'$ into operative relation with it and to be moved transversely to the vehicle to operate that rod which is in such relation. The fulcrum on which the lever moves to bring either rod $r$ or $r'$ to the operative position consists of a pin $s$, by which it is pivoted horizontally into a slotted yoke T, which is journaled at one end, as shown in Figs. 7, 7*, 8, and 9, into a stationary box U, which is secured to the front of the seat A*, and the other end in a small bracket U', secured to the side of the seat, the two journals constituting the fulcrum-pivot $t$. Within this yoke T is pivoted a guide in which a sliding link T' is fitted to move upward and downward. The rod $r$ is connected permanently with the lower part of this link T' by a pin $o$, and the rod $r'$ with its upper part by a pin $o'$, and the lever S is connected with the link between the connections of the two rods. In the top of the box U, which constitutes a locking-plate for said lever, there is an H-shaped slot $s' s^2 s^3 s^*$, through which the lever passes. When the lever is in a central position in the cross-passage of the H, as shown in Figs. 6, 7, and 8, it prevents the yoke T from turning, and so is itself prevented from turning its fulcrum $t$, and at the same time it holds the sliding link T' in such position that the connecting-rods $r$ $r'$ and the levers $p$ $p'$ hold the clutch-sleeves $n$ $n'$ in such positions as to hold all the clutches out of engagement and leave all the gears $i'$ $i^2$ $i^3$ $i^*$ loose upon the sleeve I' and so to disconnect the driving-wheels B from the motor. By moving the lever S sidewise in one or the other direction from the cross-passage of the H-shaped slot to bring it opposite either to the branches $s'$ $s^2$ or to those $s^3$ $s^*$ it is caused to lower or raise the sliding link T', and thus bring the connecting-pin $o$ or $o'$ of the rod $r$ or $r'$ to an operative distance from the fulcrum $t$, while the other of said pins $o$ or $o'$ is in line with the fulcrum $t$, as illustrated in Fig. 7*, and consequently inoperative. Then by turning the lever into one of the four branches $s'$ $s^2$ $s^3$ $s^*$ of the H-shaped slot the yoke T and link T' are caused to turn with it on the fulcrum $t$, and so through the rod $r$ or $r'$ and lever $q$ or $q'$ to shift the sleeve $n$ or $n'$ and bring one of the clutches into operation and clutch one of the gears $i'$ $i^2$ $i^3$ $i^*$ to the shaft I'. Thus, for example, when the lever is turned into the branch $s'$ it brings the clutch Q' into operation for the fast speed, when it is turned into $s^3$ it brings $Q^3$ into operation for the slowest speed, when moved into $s^2$ it brings $Q^2$ into operation for the medium speed, and when moved into $s^*$ it throws $Q^*$ into operation for backing, all but one clutch being in either case out of gear. It will thus be seen that the lever S may be made to effect the quadruple changes from any one speed to any other of three speeds or for reversing by passing it for every change over the central stopping position. Within the yoke T there is applied, below said lever S, a spring $t'$, which tends to hold the lever in the central position when not thrown aside into one of the branches of the slot, the strength of this spring being sufficient to support the weight of the link T' and of so much of the weight of the rods $r$ $r'$ as comes upon said link.

Figure 4:
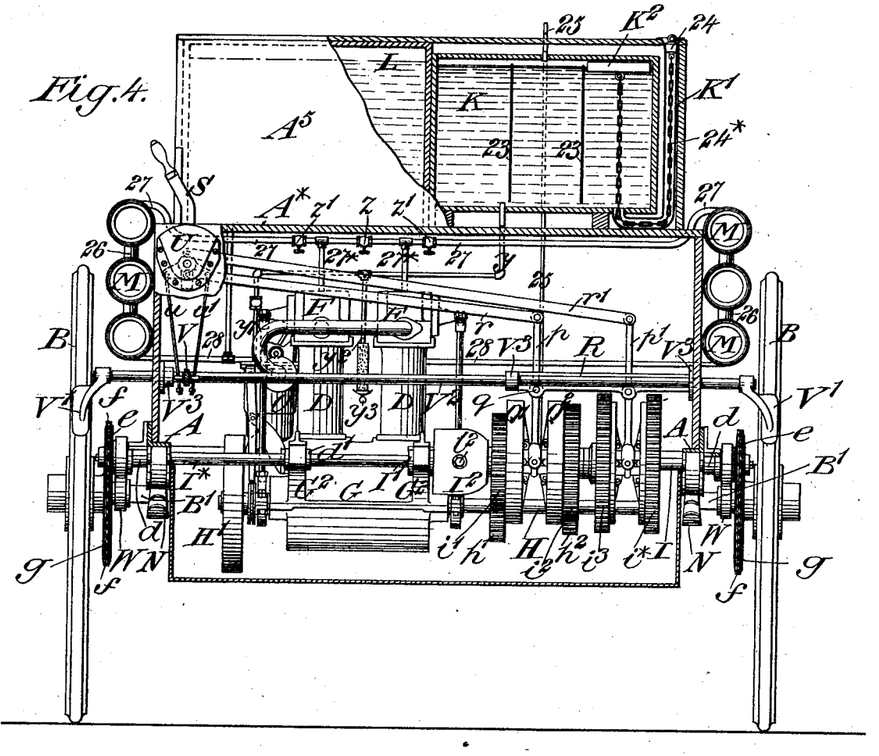
Fig. 4, a transverse vertical section taken just in front of the hind or driving wheels, showing the gasolene-tank and a water-tank in section.

The yoke T has two laterally-projecting arms $t^*$ $t^{*'}$, (see Figs. 9 and 10,) from which there depend two rods $u$ and $u'$, either of which may form a connection with the foot-lever V of the brake for bringing the lever S into or opposite the cross of the H-shaped slot and so throwing all the clutches out of gear whenever the brake is set in operation. The brake represented is of ordinary kind, consisting of two shoes V', one for each driving-wheel B, carried by a shaft $V^2$, which is arranged, as shown in Fig. 4, across the vehicle in suitable fixed bearings $V^3$, one of which is represented as in the bracket R, which carries the clutch-levers $p$ $p'$. The foot-lever V is affixed to the said shaft $V^2$. The said rods $u$ $u'$ pass through lugs $V^4$ on opposite sides of the brake-lever V, as shown in Fig. 10, and they are screw-threaded on their lower parts to receive nuts $u^2$ below the lugs $V^4$, the said nuts serving to adjust the operation of the brake-lever on the hand-lever S. When the vehicle is running, the yoke T is always turned in one direction or the other—for example, as shown in dotted outline in Fig. 10, from the central inoperative position, shown in full outline in said figure—and one of the rods $u$ $u'$ has its nut $u^2$ just below the corresponding lug on the brake-lever, so that when the said lever is depressed to operate the brake it turns the yoke T to the central position (shown in Fig. 10) and brings the lever S opposite the cross of the H-shaped slot and so throws the previously-operating clutch out of gear and leaves all the clutches out of gear until the brake-lever is released and the lever S again placed in position for bringing one of the clutches into action.

Figure 12:
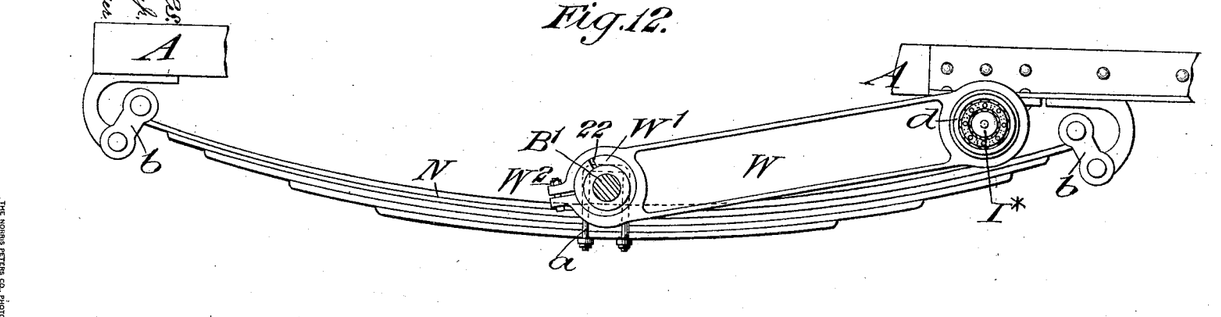
Fig. 12, a side view of one of the side springs of the vehicle, showing its connections with the carriage and the connection between said axle and the power-transmitting mechanism.

To relieve the driving-chains $f$ from all strain but what results from the transmission of rotary motion and to relieve the spring from all effort except the one due to the weight of the superincumbent parts of the vehicle, I connect the axle B' of the driving-wheels B with the platform A on each side of the latter by a rigid thrust-rod W. The connection of the said rod with the platform is represented as made with the journal-box $d$ of the shaft I I*, as shown in Figs. 12 and 13. The said rod is so pivoted upon the exterior of the said box $d$ independently of the shaft $I\ I^*$ and upon the axle $B'$ that it may oscillate as required by the upward and downward movements of the spring and platform, the said oscillation being permitted to take place freely by the swinging links $b$, by which the connection of the spring and platform is made and upon which the frame is free to swing backward and forward to a limited extent. The connection between the thrust-rod $W$ and the axle $B'$ is made by means of an eccentric bushing $W'$, which is free to turn on the axle, but is clamped tightly within an eye formed within the end of the rod by a clamping-screw $W^2$, the end of the rod being made open for the purpose. By slackening the screw $W^2$ the eccentric is loosened, so that it may be turned on the axle for the purpose of adjusting the distance between the axle and the shaft and so adjusting the tension of the driving-chain. After this the rod is tightened on the eccentric and the adjustment of the chain secured. In Fig. 12 a notch 22 is shown in the said eccentric for the reception of a suitable instrument for turning it.

The front bar $A^3$ of the platform or frame is supported on the front axletree $P$ by means of the spring $P'$, represented as of semi-elliptic or bow form, arranged transversely of the vehicle. The said spring, having the bar $A^3$ resting on the crown of its arch, is secured at the center of the carriage by means of a clip $p^3$, which passes under the said bar $A^3$ and is secured thereto by a pivot-pin 30, passing through a small block 31, arranged upon the top of the said bar $A^3$. A laterally-rocking connection is thus formed between the spring and the frame. The ends of the said spring are pivotally connected with the axletree, as shown in Fig. 3, by pivots 31* in clips 38, fastened upon the axletree, one of said connections being made by a short link 32*, which compensates for the varying flexure of the spring caused by variations of the load and by unevenness of the ground. The axletree is connected near its ends with the platform or frame of the vehicle by side braces 32, the front ends of which are pivoted, as shown at 33 in Fig. 2, to the axletree and the rear ends of which are pivoted, as shown at 34 in the same figure, to rigid hangers 35, which also serve to carry the steps 36. These hangers are braced to the side bars $A$ by diagonal braces 37, which make them practically rigid portions of the frame. The side braces 32, while bracing the ends of the axle and transmitting thereto the driving force, permit, owing to their pivotal connections at both ends, the yielding of either end of the spring and the vertical oscillation of either end of the axletree, which are necessary to compensate for unevenness of roads.

The steering-lever $X$ is arranged upright in front of the seat $A^*$, to be operated with a direct push-and-pull movement only, such arrangements giving the driver better control than the arrangement of steering levers and wheel heretofore used in such vehicles. The said lever works on a fulcrum $x$, supported on the footboard $A^4$, and it projects downward through the footboard and is connected by a rod $x^*$ with one arm of a double-elbow lever $X'$, working horizontally on a fulcrum-pin $x'$ in a clamp $x^2$, secured upon the axletree $P$, the elbows of said lever $X'$ being connected by rods $X^2$ with arms $C^3$, which are secured by screws and nuts $C^4$ to the cross-heads $C'$ of the axles $C^2$ of the wheels $C$. By pushing or pulling the lever $X$ the wheels are turned in one direction or the other, as indicated by dotted outlines in Fig. 5.

It has been hereinbefore stated that the back $A^5$ of the seat constitutes a box or chamber containing the gasolene-tank $K$ and the water-tank $L$. The gasolene-tank $K$ has at its bottom a pipe $y$, with two branches $y'$ and $y^2$, the branch $y'$ leading to the carbureter $O$ for carbureting the air therein and the branch $y^2$ to the igniting-lamp $y^3$. The said tank has provided in it partitions 23, open at top and bottom to reduce the tendency of the liquid to strike the sides of the tank when the vehicle lurches sidewise. For the filling of the said tank from time to time, as required, a funnel-mouthed pipe $K'$ is provided at one side, communicating with the tank at the bottom, as shown in Fig. 4, in the form of an inverted siphon, in which the liquid forms a seal to prevent air from entering the tank, the upper part of the said pipe projecting above the tank and being fitted with a stopper 24, to which a float $K^2$ within the tank is connected by a light chain 24*, passing through the said pipe. This serves to prevent the loss or jumping out of the stopper, but also serves a more important purpose—viz., that of a gage to ascertain the quantity of liquid in the tank at any time by pulling up the stopper. When the liquid is low, the chain simply coils or piles up in the lower part of the filling-tube. When filling the tank, the stopper hanging over the edge of the funnel shows the increasing quantity of liquid in the tube and tank. A very small pipe 25 opens at its upper end to the tank, and thence rising a little above the top thereof and descending to a muffler $Y'$, into and through which the exhaust-pipe $Y$ of the motor discharges the spent gases therefrom. This pipe 25 keeps the upper part of the tank filled with the spent gas instead of with air, and thus obviates the formation of explosive gases in the tank, which might occur if air should be allowed to enter it. When the tank is being filled, the liquid simply expels these mixtures back into the muffler. When the motor is stopped, air entering the muffler cannot enter the tank, as the non-explosive mixture in it at the time is lighter than air. Thus the tank is rendered absolutely safe, as all access of air to it is shut off.

Figure 5:
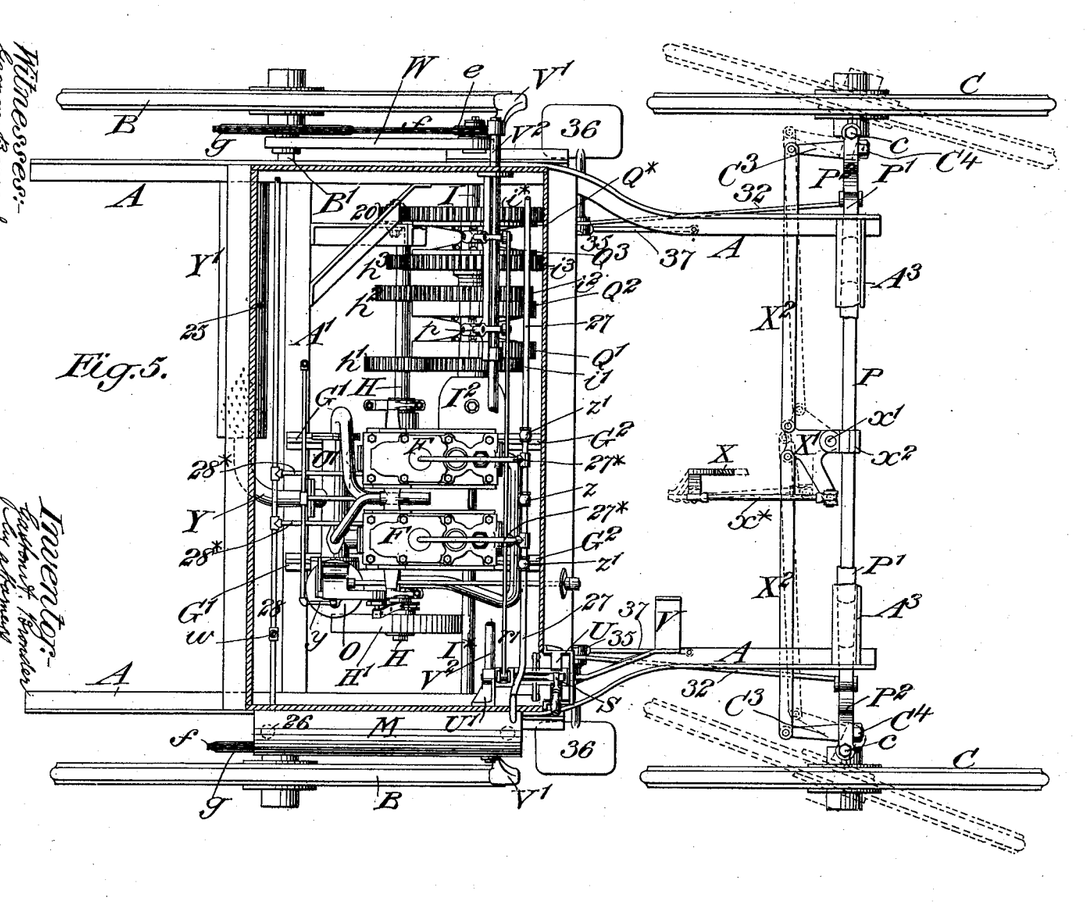
Fig. 5, a horizontal section taken below the seat and omitting the footboard.

The water-coolers $M$, of which there is one on each side of the vehicle arranged outside of the seat, are represented as consisting each of a number of cylindrical vessels—three in the example represented—of annular transverse section, each of said vessels consisting of an inner and an outer cylinder connected at their ends to form an annular space between them and the spaces of all being connected by short pipes 26, so that the water which has been used in the jackets of the motor entering the uppermost vessel M by a pipe 27 may circulate through all three and be returned cooled from the lowermost one through a pipe 28 to the jackets. The cooling of the water is effected by the air in contact with the exterior of the outer cylinders and the interiors of the inner cylinders of the several vessels M, the inner cylinders being open at both ends, such cooling effect being very active when the vehicle is in motion, and a rapid change of the air inside and outside of the cylinders is thereby effected. The pipe 27 has, as shown in Figs. 4 and 5, two branches 27*, one for the jackets of each of the two engines of the motor, and the pipe 28 has two corresponding branches 28*. The water thus circulating to and fro through the jackets and coolers is kept continually cooled, so that the same water is used over and over again, and it is only to supply any deficiency through leakage or accident that the tank L is necessary, and for this purpose the pipe $w$, (see Figs. 2, 4, and 5,) leading from the said tank to the pipe 28, is provided.

In order to provide for cooling separately the jackets of either of the two engines D E F of the motor in case only one of them should be used, I provide in the pipe 27 a stop-cock $z$ between the two branch pipes 27 and two stop-cocks $z'$, one between each of said branch pipes and the cooler M on its side of the vehicle. If both stop-cocks $z'$ are open and $z$ is closed, the circulation of water will take place independently between the jackets of each engine and the cooler on the corresponding side of the vehicle; but if the cock $z$ and one of the cocks $z'$ be open and the other cock $z'$ be closed the circulation will be stopped between the jackets of one engine and its cooler and all the circulation of water will be through the jackets of the other engine and its cooler.

What I claim as my invention is—

1. In a motor-vehicle, mechanism for driving at various speeds and reversing consisting of a motor-shaft, an intermediate shaft and means for transmitting motion therefrom to the driving-wheels, three gears of various sizes fast on the driving-shaft, three gears of correspondingly-varying sizes loose on the intermediate shaft, a fourth gear fast on the motor-shaft, a fourth gear loose on said intermediate shaft, an idler-gear between said two fourth gears, clutches on said intermediate shaft one for each of the gears thereon, two clutch-operating sleeves on said intermediate shaft, each of said sleeves for clutching one of two of the loose gears while the other is free, a hand-lever having two fulcrums transverse to each other, two intermediate levers one for each of said sleeves, a link connected with the hand-lever, and connections between opposite ends of said link and the two intermediate levers, all in combination substantially as herein described for the purpose of driving the vehicle at different speeds forward and of backing.

2. In a motor-vehicle, the combination of a motor-shaft, a power-transmitting shaft, quadruple changeable gearing and clutches therefor between said shafts, a hand-lever having two fulcrums transverse to each other, connections between said lever and the several clutches, and a locking-plate for said lever having an H-shaped slot each of the four branches of which receives said lever during the engagement of one of said clutches and the cross of which receives said lever in its position for disengaging all the clutches, substantially as herein described.

3. In a motor-vehicle, the combination of a motor-shaft, a power-transmitting shaft, a plurality of gears of various sizes fast on one shaft and corresponding gears loose on the other shaft for driving at different speeds, clutches on the latter shaft and operating mechanism therefor for fastening one only of said loose gears to said shaft or disengaging all of them therefrom, a brake for the driving-wheels of the vehicle and means for operating the said brake, and a connection between the clutch-operating mechanism and the brake-operating mechanism for throwing all the clutches out of engagement by the act of applying the brakes, all substantially as herein described.

4. The combination of the motor-shaft, the intermediate shaft I' and means for transmitting motion therefrom to the driving-wheels of the vehicle, three gears of various sizes fast on one of said shafts, three gears of correspondingly various sizes loose on the other of said shafts, a fourth gear fast on the one shaft and a fourth gear loose on the other shaft, an idler-gear between said two fourth gears, clutches on the one shaft for each of the loose gears thereon, two clutch-operating sleeves on the latter shaft, each of said sleeves for clutching one of two of the loose gears thereto while the other is free, a yoke T pivoted in fixed bearings, a hand-lever S pivoted in said yoke at right angles to its own pivots, a link T' connected with said hand-lever and sliding in said yoke, two levers $p\ p'$ each for operating one of said clutch-operating sleeves, two rods $r\ r'$ connecting said levers $p\ p'$ with opposite ends respectively of said yoke, all substantially as and for the purpose herein described.

5. In a motor-vehicle, the combination of the motor-shaft, the power-transmitting shaft, a plurality of gears of various sizes fast on one shaft and corresponding gears loose on the other shaft for driving at different speeds, clutches on the latter shaft for fastening one only of said loose gears to said shaft or disengaging all of them therefrom, a yoke and a fixed support for pivots on said yoke, a link in said yoke, a hand-lever pivoted in said yoke transversely to its own pivots and connected with said link, connections between said link and the clutches, a brake and an operating-lever therefor and connections from opposite sides of said yoke to the latter lever, all substantially as and for the purpose herein described.

6. In a motor-vehicle, the combination with the supporting-frame, a driving-wheel axle and wheels, a power-transmitting shaft and journal-boxes therefor on said frame, and means for transmitting motion from said shaft to either driving-wheel, of a thrust-rod having a pivotal connection at one end around the said axle and pivoted at the other end concentrically around and upon the exterior of one of the said journal-boxes, substantially as herein described.

7. In a motor-vehicle, the combination with the supporting-frame, the driving-wheel axle and wheels, a power-transmitting shaft and bearings on said frame for said shaft, a sprocket-wheel on said shaft, a sprocket-wheel on either driving-wheel and a driving-chain on said sprocket-wheels, of a thrust-rod having a pivotal connection at one end with said shaft and having within the other end an adjustable eccentric bushing within which is formed a pivotal connection with the driving-wheel axle, substantially as herein described.

8. The combination with the frame of the vehicle, of a spring having a transversely-rocking connection with the frame, a front axletree connected near its ends with the ends of said spring, and vertically-oscillating side braces connecting said axletree with the frame, substantially as herein described.

9. The combination with the vehicle-frame of a transversely-arranged spring pivoted centrally to said frame, a front axletree pivotally connected with the ends of said spring, and side braces pivotally connected at their front ends with the axle and at their rear ends with the frame, substantially as herein described.

In testimony that I claim the foregoing as my invention I have signed my name, in presence of two witnesses, this 15th day of February, 1898.

GASTON A. BRONDER.

Witnesses:
FREDK. HAYNES,
LIDA M. EGBERT.